(No Model.)

E. R. ANGELL.
MACHINE FOR REMOVING SNOW AND ICE FROM SIDEWALKS.

No. 328,633. Patented Oct. 20, 1885.

WITNESSES:
Chas. Nigg
C. Sedgwick

INVENTOR:
E. R. Angell
BY Murphy
ATTORNEYS.

United States Patent Office.

EDMUND R. ANGELL, OF DERRY, NEW HAMPSHIRE.

MACHINE FOR REMOVING SNOW AND ICE FROM SIDEWALKS.

SPECIFICATION forming part of Letters Patent No. 328,633, dated October 20, 1885.

Application filed October 25, 1884. Serial No. 146,464. (No model.)

*To all whom it may concern:*

Be it known that I, EDMUND R. ANGELL, of Derry, in the county of Rockingham and State of New Hampshire, have invented certain new and useful Improvements in Machines for Removing Snow and Ice from Sidewalks, of which the following is a full, clear, and exact description.

Reference is to be had to the accompanying drawings, forming part of this specification, in which similar letters of reference indicate corresponding parts in all the figures.

Figure 1:
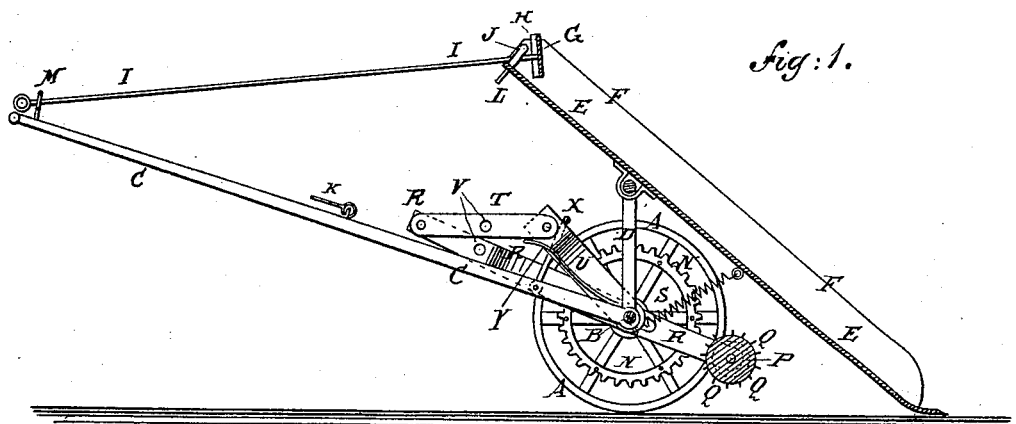
Figure 2:
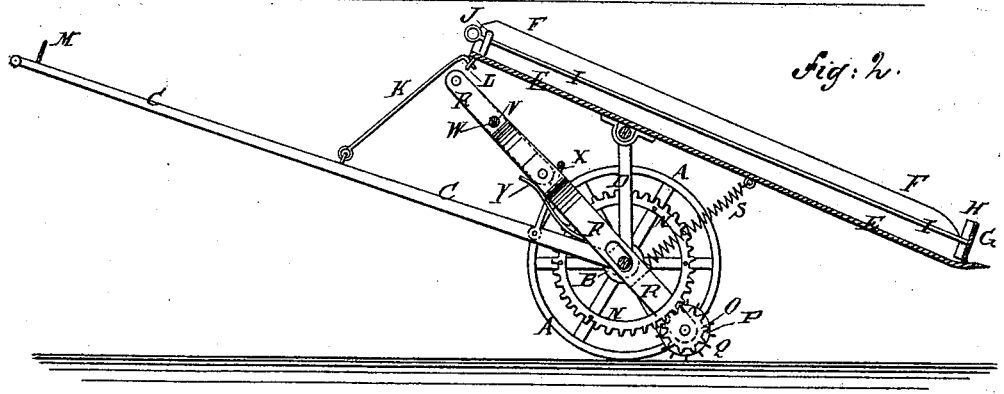
Figure 3:
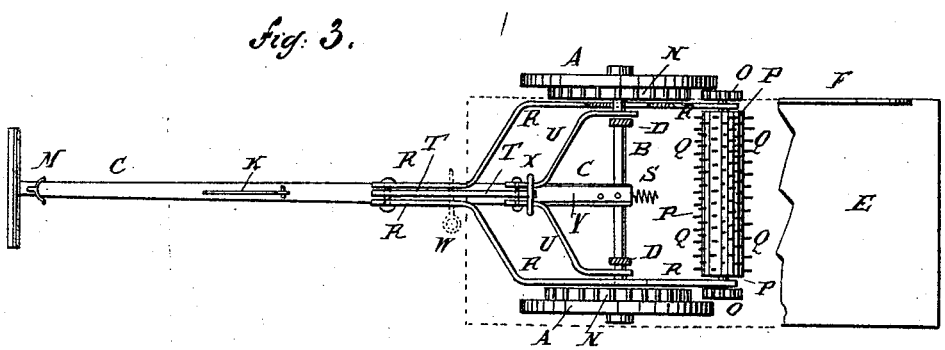

Figure 1 is a sectional side elevation of my improved machine, shown in position for removing snow. Fig. 2 is a sectional side elevation of the same, shown in position for loosening ice and crust. Fig. 3 is a plan view of the same, parts being broken away.

The object of this invention is to provide machines, simple in construction, readily controlled and operated, and reliable in operation, for removing snow and ice from sidewalks.

The invention relates to a machine for removing snow and ice from sidewalks constructed with wheels, axle, and a handle and a spring-held shovel hinged to a bail rigidly attached to the axle. A cylinder provided with cutters is connected with the drive-wheels by gear-wheels, and is journaled to slotted bars riding upon the axle and connected at their rear ends by a short connecting-bar to the rear end of bars hinged to the axle, whereby ice and crust can be readily loosened. The hinged bars are connected with the handle by a keeper and a spring, whereby the upward movement of the said bars is limited and the cutter-cylinder is allowed to rise should it strike an obstruction, as will be hereinafter fully described.

A are the drive-wheels, to the center of the axle B of which is rigidly attached the end of the handle C, by means of which the machine is guided.

To the end parts of the axle B are rigidly attached the ends of a U-shaped bar or bail, D.

To the upper or middle part of the rigid bail D is hinged the shovel E at a point a little above the center of the said shovel. The shovel E is made of sheet-iron or other suitable material, and its forward edge is bent forward, as shown in Figs. 1 and 2, so that it will more readily pass beneath snow upon the sidewalk and will be less likely to be obstructed by any unevenness in the said sidewalk. The forward end of the shovel E is held down in a working position by a spiral or other spring, S, one end of which is attached to the forward part of the lower side of the said shovel, and its other end is attached to the axle B.

Upon one or both the side edges of the shovel E is formed an upwardly-projecting flange, F, to prevent the snow from sliding off the said edge or edges.

G is a scraper of such a length as to extend across the shovel E. Upon one or both ends of the scraper G is formed a rearwardly-projecting flange, H, to rest against the flange F of the shovel E, and cause the said scraper to move down the said shovel squarely.

To the center of the scraper G is attached the end of a handle, I, which passes through a guide, J, attached to the center of the upper end of the shovel E, so that the said scraper can be readily controlled. The handle I is made of such a length that the scraper G can be conveniently operated.

When the shovel E is not in use, its lower end is held away from the ground by a hook, K, hinged to the handle C and hooking into an eye, L, attached to the lower side of the upper end of the said shovel, as shown in Fig. 2.

To the rear part of the handle C is attached a hook, M, or other catch, to receive and hold the end of the scraper-handle I, and thus hold the scraper G at the upper end of the shovel E, as shown in Fig. 1.

To the drive-wheels A are attached, or upon them are formed, large gear-wheels N, the teeth of which mesh into the teeth of small gear-wheels O, attached to or formed upon the ends of a cylinder, P, so that the said cylinder, when the gear-wheels N O are in gear, will be revolved by the advance of the machine. The cylinder P is provided with rows of teeth or cutters Q, arranged with the teeth or cutters of each row opposite the spaces between the teeth or cutters of the adjacent rows. The cylinder P is journaled at its ends to the ends of two bars, R, which are slotted to receive and ride upon the axle B, so that a rearward movement of the bars R will throw the gear-wheels O into gear with the gear-wheels N, as shown in Fig. 2, and a forward movement of the said bars R will throw the said gear-wheels out of gear, as shown in Fig. 3. The bars R are bent inward until they nearly meet, and are then bent to the forward, so that their rear parts will be parallel with each other. The rear ends of the bars R are secured to each other and to the rear end of a short connecting-bar, T, interposed between them. The forward end of the connecting-bar T is pivoted to and between the rear ends of two bars, U, which are bent outward and then forward, and their forward ends are hinged to the axle B. The bars U are arranged at an upward inclination with the handle C, as shown in Figs. 1 and 2.

The bars T U are made of such a length that when the said bars are in line and in the same plane with the bars R, as shown in Fig. 2, the gear-wheels N O will be in gear with each other. With this construction, when the rear ends of the bars R are lowered, bringing the bar T into an inclined position with reference to the bars U, and bringing the bars R out of the plane of the said bars U, as shown in Fig. 1, the bars R will be pushed forward upon the axle B, throwing the gear-wheels N O out of gear.

In the bars T R are formed holes V in such positions as to register when the said bars are in the same plane, so as to receive a pin, W, to lock the said bars in place and the gear-wheels N O in gear, as shown in Fig. 2 and in dotted lines in Fig. 3.

The upward movement of the bars U is limited by the U-shaped rod X or other suitable keeper, the ends of which are attached to the handle C, and its bend passes over the rear ends of the said bars U.

The bars U are held up, holding the cutter-cylinder P, when the bars R U are connected by the pin W, in a working position by the spring Y, attached to the handle C and pressing against the lower side of the rear ends of the said bars U, so that should the cutter-cylinder P strike an obstruction it can rise and pass the said obstruction by forcing the rear ends of the bars R U downward against the pressure of the spring Y.

When the machine is to be used for removing loose snow and ice, the shovel E is lowered into the position shown in Fig. 1, and the said machine is pushed forward until the shovel E is loaded. The machine is then taken to the gutter or other dumping-place, and the load is allowed to slide off the said shovel. In case the load should not slide off readily, it is pushed off with the scraper G.

When the machine is to be used for loosening ice or crust, the shovel E is raised from the ground and secured by the hook K. The bars R are raised, throwing the gear-wheels N O into gear and lowering the cutter-cylinder P into a working position, and secured in place by the pin W, and the machine is moved forward, causing the cutters Q to break in pieces and loosen the ice or crust. When the ice or crust has been thoroughly loosened by passing the machine one or more times over it, the cutter-cylinder is thrown out of gear, the shovel is again adjusted in a working position, and the loosened ice or crust is removed in the manner first described.

In case ice is covered by loose snow, the shovel E and cutter-cylinder P can both be lowered into working positions, and the loose snow removed and the underlying ice loosened at one operation.

Having thus described my invention, what I claim as new, and desire to secure by Letters Patent, is—

1. In a machine for removing snow and ice from sidewalks, the combination, with a carriage, of a shovel hinged to suitable supports projecting upward from the axle of the carriage, a cylindrical cutter beneath the shovel, a frame in which the said cutter is mounted adjustably held on the axle, and mechanism for operating the cutter by the forward movement of the carriage, substantially as herein shown and described.

2. In a machine for removing snow and ice from sidewalks, the combination, with the wheels, axle, and handle A B C, of the rigid bail D, the hinged shovel E, and the spring S, substantially as herein shown and described, whereby loose snow and ice can be readily removed, as set forth.

3. In a machine for removing snow and ice from sidewalks, the combination, with the wheels, axle, and handle A B C, of the gear-wheels N O, the cylinder P, having cutters Q, the slotted bars R, the hinged bars U, and the connecting-bar T, substantially as herein shown and described, whereby ice and crust can be readily loosened, as set forth.

4. In a machine for removing snow and ice from sidewalks, the combination, with the handle C, the bars U, the cylinder P, and connecting mechanism, of the keeper X and the spring Y, substantially as herein shown and described, whereby the upward movement of the said bars is limited and the cutter-cylinder is allowed to rise should it strike an obstruction, as set forth.

EDMUND R. ANGELL.

Witnesses:
BENJAMIN CHASE, Jr.,
GREENLEAF C. BARTLETT.